(12) United States Patent
Roskind et al.

(10) Patent No.: US 8,484,333 B2
(45) Date of Patent: Jul. 9, 2013

(54) SINGLE UNIVERSAL AUTHENTICATION SYSTEM FOR INTERNET SERVICES

(75) Inventors: Jim Roskind, Redwood City, CA (US); Rory Ward, Sunnyvale, CA (US)

(73) Assignee: AOL Inc., Dulles, VA (US)

( * ) Notice: Subject to any disclaimer, the term of this patent is extended or adjusted under 35 U.S.C. 154(b) by 3015 days.

(21) Appl. No.: 09/935,439

(22) Filed: Aug. 22, 2001

(65) Prior Publication Data
US 2003/0041240 A1 Feb. 27, 2003

(51) Int. Cl.
*G06F 15/16* (2006.01)
*G06F 15/173* (2006.01)

(52) U.S. Cl.
USPC .......... 709/224; 709/201; 709/202; 709/203; 709/217; 709/218; 709/223; 709/225

(58) Field of Classification Search
USPC .................. 709/223–229; 715/507; 713/172, 713/201
See application file for complete search history.

(56) References Cited

U.S. PATENT DOCUMENTS

| | | | | |
|---|---|---|---|---|
| 5,649,099 | A | | 7/1997 | Theimer et al. .......... 395/187.01 |
| 5,790,785 | A | * | 8/1998 | Klug et al. ..................... 713/201 |
| 5,815,665 | A | * | 9/1998 | Teper et al. ................... 709/229 |
| 5,905,862 | A | * | 5/1999 | Hoekstra ....................... 709/229 |
| 5,987,440 | A | * | 11/1999 | O'Neil et al. .................. 705/44 |
| 6,088,451 | A | * | 7/2000 | He et al. ....................... 709/227 |
| 6,226,752 | B1 | | 5/2001 | Gupta et al. .................. 713/201 |
| 6,421,768 | B1 | | 7/2002 | Purpura ........................ 711/164 |
| 6,564,320 | B1 | * | 5/2003 | de Silva et al. ............... 713/201 |
| 6,678,731 | B1 | * | 1/2004 | Howard et al. ............... 709/225 |
| 6,820,204 | B1 | * | 11/2004 | Desai et al. ....................... 726/6 |
| 6,879,965 | B2 | * | 4/2005 | Fung et al. ....................... 705/39 |
| 6,910,179 | B1 | * | 6/2005 | Pennell et al. ................ 715/507 |
| 6,981,028 | B1 | * | 12/2005 | Rawat et al. .................. 709/217 |
| 7,082,532 | B1 | * | 7/2006 | Vick et al. ..................... 713/155 |

* cited by examiner

*Primary Examiner* — Thu Nguyen
*Assistant Examiner* — Angela Widhalm
(74) *Attorney, Agent, or Firm* — Michael A. Glenn; Glenn Patent Group

(57) ABSTRACT

A single universal authentication system for Internet services provides a trusted server that is activated when a user clicks on the login or helper button on a third party's site, which submits a request to the trusted server. The client properly identifies itself to the trusted server through pre-authorization techniques such as cookies, logging on, or going through the AOL service wherein the service knows the user's identity. The trusted server sends a user/site specific authentication token to the third party, initiating the authentication process with the third party which checks to see that the authentication token is valid and sends its own authentication token back to the trusted server. The trusted server verifies from its partner database that the third party's authentication token is valid. If it is valid, then the trusted server fills in the third party's form using the information from the user database and filtering the information through a filter that contains the user preferences concerning his personal information and then returns the form to the third party. The trusted server can fill in fields of a form from an unknown third party that the user feels are not threats to his security. The user is then queried as to whether the information can be released. The filter tells the system which information that the user feels is a low security threat.

36 Claims, 5 Drawing Sheets

Fig. 1

SINGLE UNIVERSAL AUTHENTICATION SYSTEM FOR INTERNET SERVICES

BACKGROUND OF THE INVENTION

1. Technical Field

The invention relates to populating user information forms in a computer environment. More particularly, the invention relates to the transfer of user information from a trusted source to a third party in a computer environment.

2. Description of the Prior Art

Many types of services are currently offered on the Internet. Most of these services require a user to "register" before gaining access to the service. The registration process consists of the user supplying a collection of personal information (e.g., name, address, phone, etc.) to the service.

Many sites have found that users often decline to use a service because they are impatient with the process of filling out registration forms. Statistics show that each additional line in a registration form directly reduces the percentage of users that read the form and are willing to register. Optimally, it would be desirable to remove the form filling action completely, however, there is so much value (e.g., targeted advertisement) in getting a registration, that many sites persist in requiring registration (even for "free" services) knowing that it reduces the usage of the service by presenting a block to users at the registration point.

Currently, the most common approach is to not require registration. This works, but reduces the value to a commerce site.

Some systems have been developed which provide for the "sharing" of user information. The drawback to these systems is that they require the downloading of special purpose "wallet or passport" applications. Additionally, there is an even higher decline rate for users when they are offered a chance to "download" an application.

These problems greatly diminish the acceptance of downloaded wallet or passport applications. Wallet applications are not as desirable and of less importance to merchant sites, thereby making the applications less valuable to users which further reduces adoption. This means that the merchant sites do not get any data if the users skip registration. In practice, adoption rates of download based client side wallets are very poor.

Yahoo shopping and clubs allow users to transition from site to site within the Yahoo internal network without having to log in each time a new storefront or club is entered. However, the storefronts and clubs reside on the Yahoo server network.

Some SSL sites allow users to access associated sites through the SSL site. The SSL site acts as an intermediary for auto logins. The drawback to this approach is that all traffic goes through the SSL site.

Microsoft Passport is another example that supplies a button on a participating site that allows the user to login to the site by clicking on the button. Microsoft Passport only deals with the task of automatically logging onto an associated site.

Another approach requires the user to enter all of his login IDs and passwords to other sites into the host site's database. The user then visits the host site to access all of the other sites. The drawback to this approach is that the user has to reveal all of his passwords to the host site, which presents a security risk.

It would be advantageous to provide a single universal authentication system for Internet services that automatically and transparently performs the login and form filling functions for the user. It would further be advantageous to provide a single universal authentication system for Internet services that allows the user to characterize the amount of information released to a third party.

SUMMARY OF THE INVENTION

The invention provides a single universal authentication system for Internet services. The system automatically and transparently performs the login and form filling functions for the user. In addition, the invention allows the user to characterize the amount of information released to a third party.

A preferred embodiment of the invention provides a trusted server. The trusted server is activated when a user clicks on the login or helper button on a third party's site, which submits a request to the trusted server. The client properly identifies itself to the trusted server through pre-authorization techniques such as cookies, logging on, or going through the AOL service wherein the service knows the user's identity.

The trusted server sends a user/site specific authentication token to the third party, initiating the authentication process with the third party. The third party checks to see that the authentication token is valid and sends its own authentication token back to the trusted server.

The trusted server verifies from its partner database that the third party's authentication token is valid. If it is valid, then the trusted server fills in the third party's form and returns it to the third party. The trusted server uses the information from the user database and filters the information through a filter that contains the user preferences concerning his personal information.

The trusted server can fill in fields of a form from an unknown third party that the user feels are not threats to his security. The user is then queried as to whether the information can be released. The filter tells the system which information that the user feels is a low security threat.

Other aspects and advantages of the invention will become apparent from the following detailed description in combination with the accompanying drawings, illustrating, by way of example, the principles of the invention.

BRIEF DESCRIPTION OF THE DRAWINGS

FIG. 1 is a sample screenshot of a registration form required for logging into a service according to the invention;

DETAILED DESCRIPTION OF THE INVENTION

The invention is embodied in a single universal authentication system for Internet services in a computer environment. A system according to the invention automatically and transparently performs the login and form filling functions for the user. In addition, the invention provides a system that allows the user to characterize the amount of information released to a third party.

Some registration services (such as AOL) have very high adoption rates. The invention provides a URL on a partner site that wants "automatic registration form filling." This "automatic registration" link silently redirects the user to a central service (such as AOL) where the user is already authenticated and all registration information is known for that user. The central system then pre-fills the registration form, and allows the user to click "OK" after reviewing the details, but typically changing none.

The critical point is that all AOL users have already been authenticated to AOL and hence, not even a login is typically necessary. If the user is not an AOL user, but merely, for example, a Netscape Netcenter user, then the prior authentication can serve an identical purpose, and again, registration forms are transparently filled. In the extreme, this series of redirects silently check for authentication (and appropriate data) at several central pre-registered sites and share the data with the new registration site (by pre-filling user-data into forms).

A significant extension to this system is that when the form is pre-filled by a central service (e.g., AOL, Netcenter, etc.), the central service can also supply the user-id by which the user is identified to the central system. Future logins can then be based on authentication to this central service, using a similar set of redirect techniques which check for authentication with the central service, and then pre-fill self-submitting forms for redirection back to the newly registered service.

Figure 1:
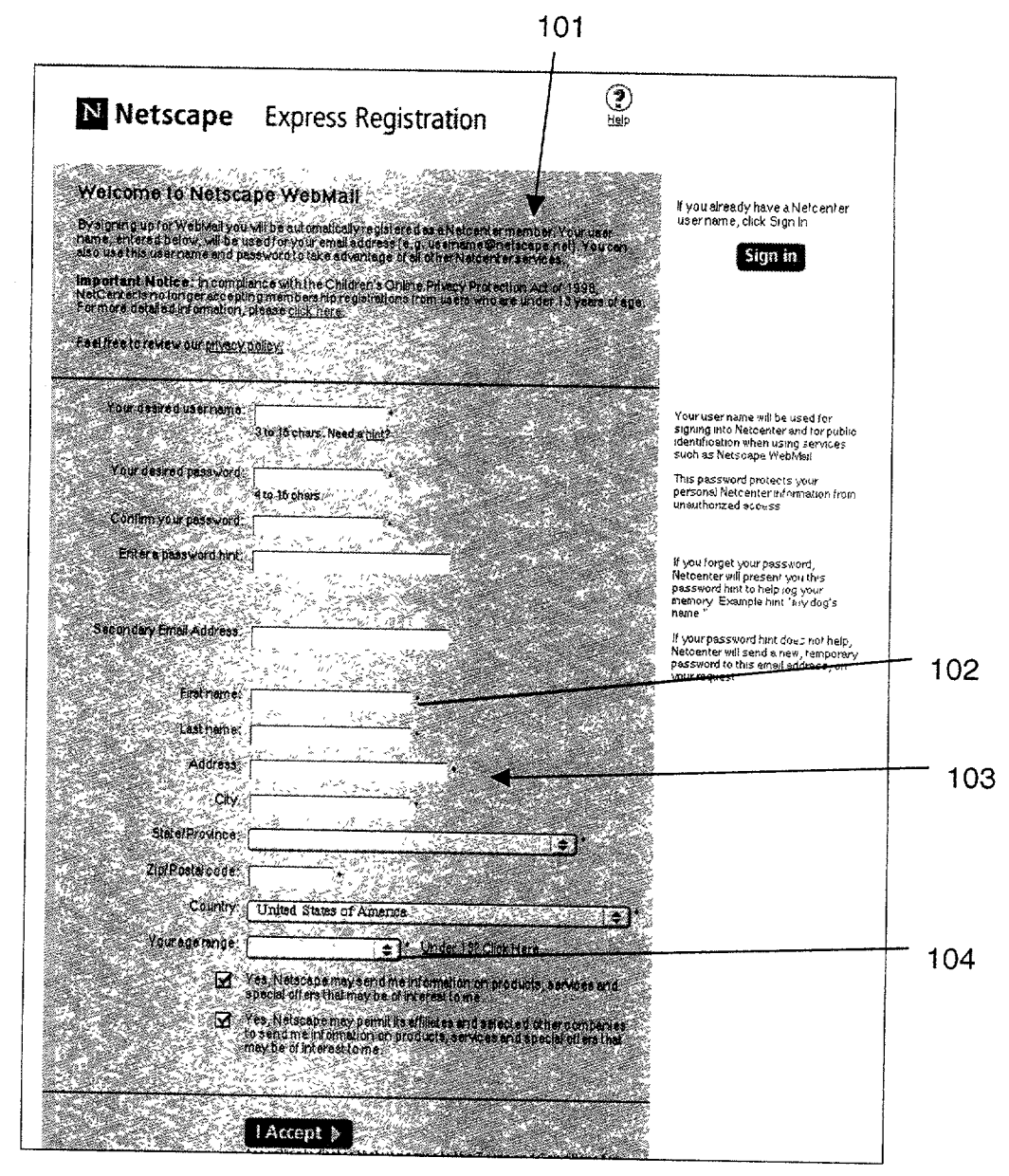

Referring to FIG. 1, the invention automatically fills out registration forms 101. This has many applications such as automatically filling in a login form and automatically submitting the form so the user doesn't notice that he is remotely logging into another site. The invention is an automatic form filling technology where the user is bounced back to a server that he is already authenticated at. Some amount of the user's information such as the user's name 102, address 103, and age 104 is inserted into a form by the central server and sent back to the user, who submits the form to the requesting site. This process happens without the user realizing what is going on. The system has security and control systems that prevent an evil site from requesting the user to log in and thereby causing him to release information without even realizing he was filling out a form.

Figure 2:
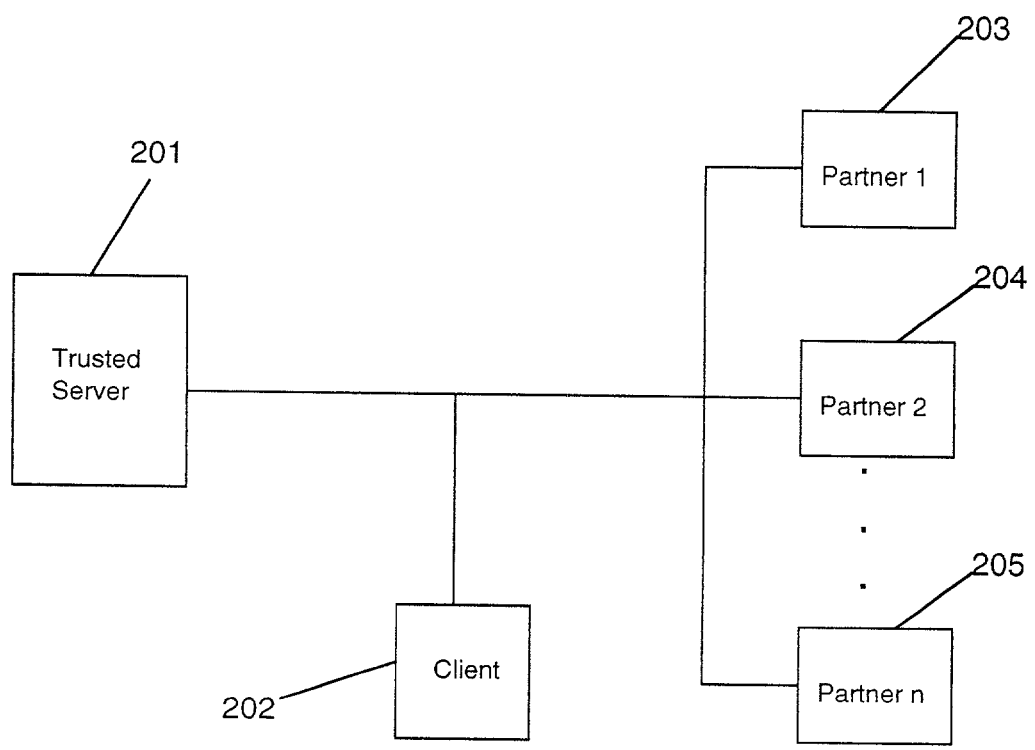
FIG. 2 is a block schematic diagram of a trusted server/partner network according to the invention.

With respect to FIG. 2, there is one trusted source 201, a large organization such as AOL, where users are already registered and trust because they have given their credit card number to register with the service or they simply trust the site. Select partners 203, 204, 205 sign up with the trusted site 201 and can request personal information about users using this trustworthy mechanism. For example, if a partner site 203 wants the user's 202 zip code, there will be a button on the site which enables the trusted site 201 to fill in the zip code without the user 202 having to type it in. The user 202 can control what he does and does not want to give out.

The invention does not allow the partners access to the user's trusted site password, nor does it allow partner sites to "spoof", or impersonate the user at other sites, including the trusted site.

All work is performed on the server side. There is no adoption problem at all because the user experience is nearly equivalent to not having to register at all—one click is required to fill out the entire registration form.

Figure 3:
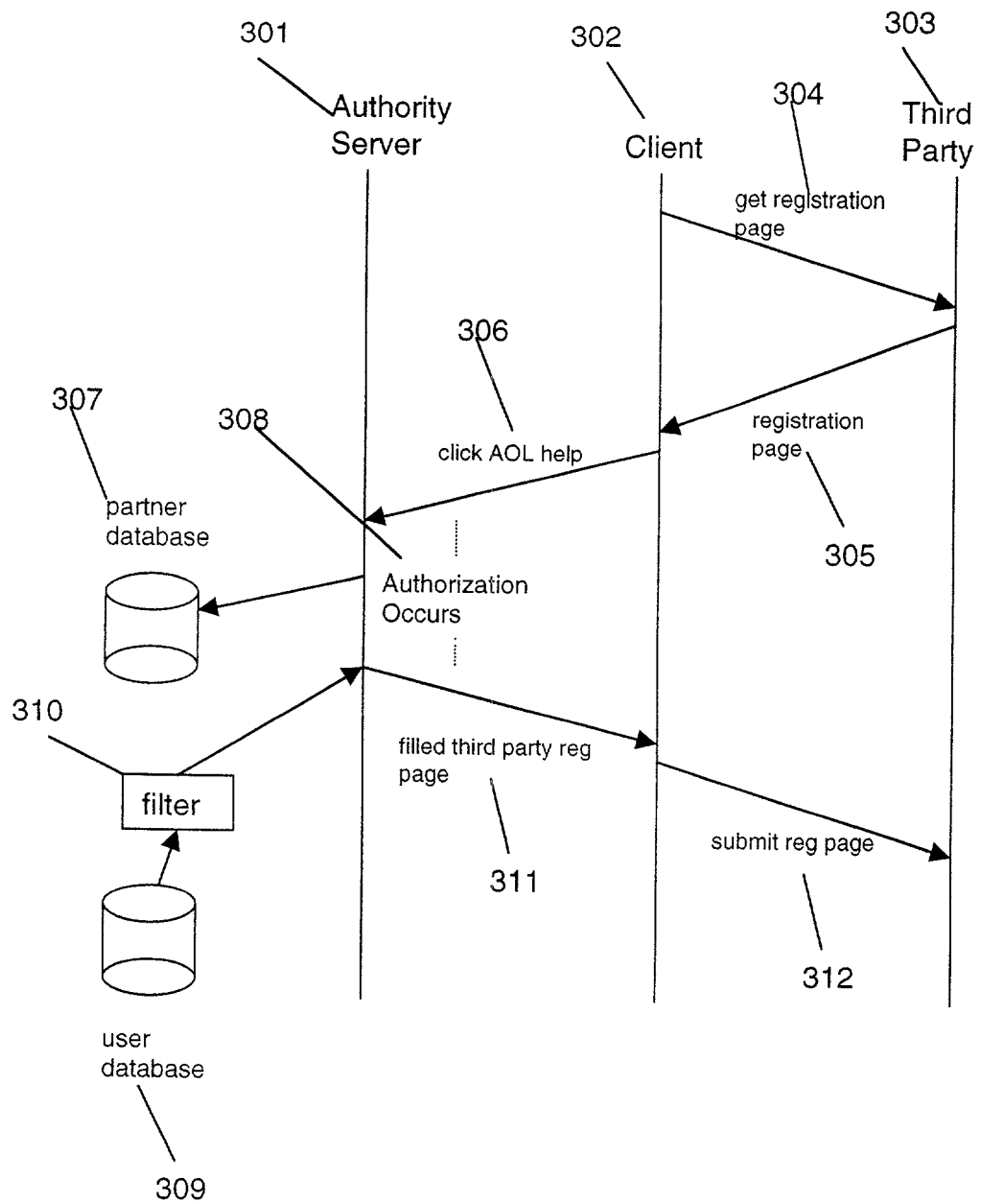
FIG. 3 is a block schematic diagram of a communication protocol between a trusted server, client, and partner according to the invention.

Referring to FIG. 3, a protocol diagram of the invention is shown. A Client 302 sends a message to the Third Party 303 requesting a registration page 304. The registration page is sent back 305 to the client 302. The client 302 clicks on the AOL helper button 306, which submits a request to the AOL Authority Server 301. The Client 302 properly identifies itself to the AOL Authority Server 301 through pre-authorization techniques such as cookies, logging on, or going through the AOL service wherein the service knows the user's identity.

The AOL Authority Server 301 confirms with the Third Party 303 that it is an authorized partner 308. The AOL Authority Server 301 sends back a third party registration fully filled 311. The Client 302 then submits the filled registration page 312, thereby completing the registration process with the third party.

The AOL Authority Server 301 checks the partner database 307 to see if the third party server 303 is an approved partner. The AOL Authority Server 301 does not want to fill in arbitrary data that was sent from the third party site 303. The AOL Authority Server 301 uses the information from the user database 309 and filters the information through a filter 310 that contains the user preferences, e.g. the user may not want to give out his residential phone number. The user preferences may also contain sites that the user does not want to give any information to, the circumstances when information should be released, or information that is not deemed to be sensitive.

The AOL Authority Server 301 fills out the fields in the form that it believes are acceptable to the user.

The AOL Authority Server 301 can fill in fields of a form from an unknown third party that the user feels are not threats to his security. The filter 310 tells the system which information that the user feels is a low security threat.

Alternatively, the AOL Authority Server 301 displays a pop-up menu to the Client 302 telling the user that the third party is unknown and is asking for X information. The pop-up asks if releasing the information is okay. The user clicks on the okay button, giving the AOL Authority Server 301 permission to release the information. Otherwise, the information is denied to the third party 303.

The invention is scalable in that there may be many trusted servers distributed across the network such that the load is distributed. User and partner databases are kept current among the trusted servers. The client is unaware of which trusted server he has been routed to.

Figure 4:
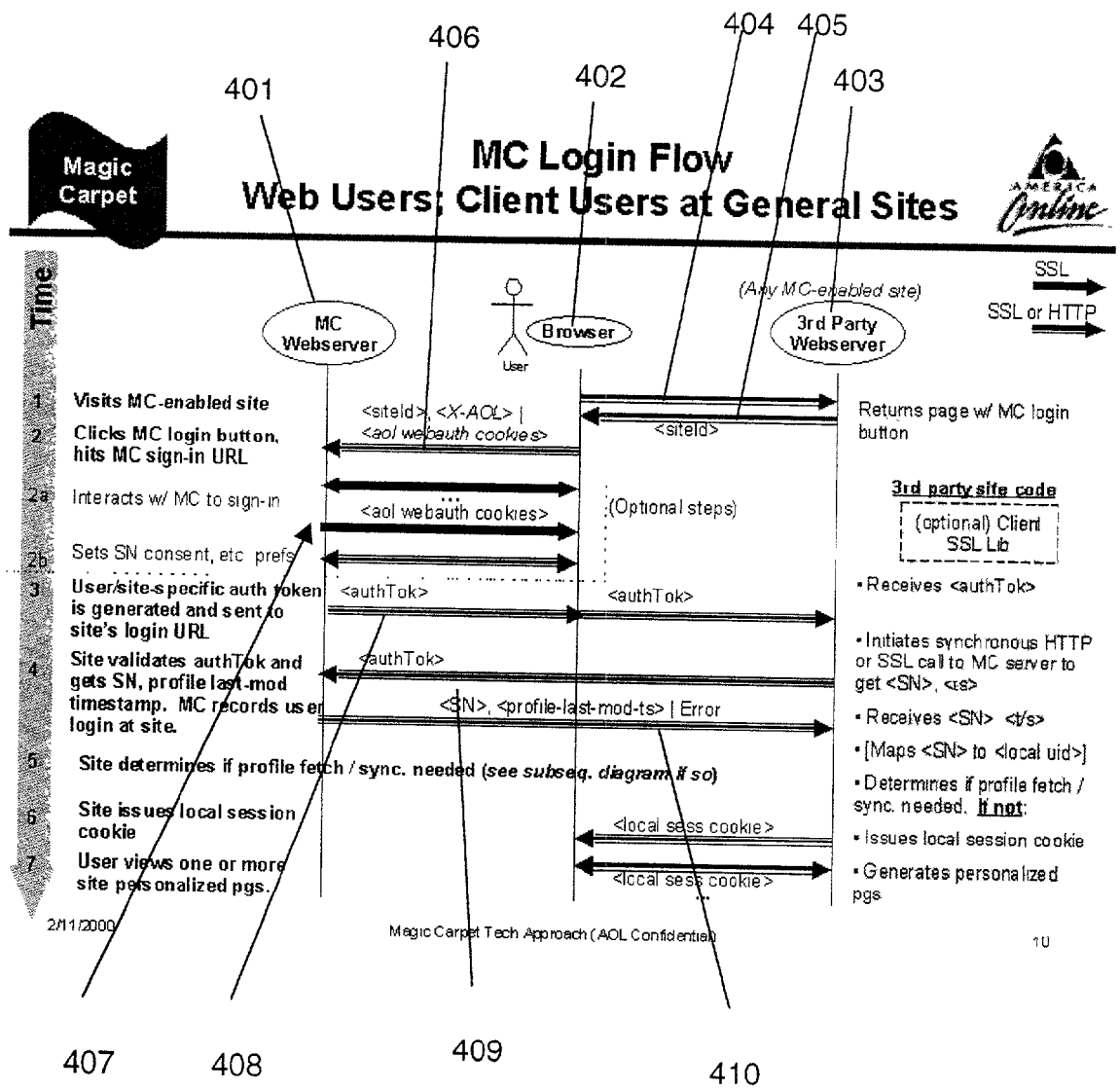
FIG. 4 is a block schematic diagram of a communication protocol between a trusted server, client, and partner showing the authentication process according to the invention.

With respect to FIG. 4, a protocol diagram showing the authentication process is shown. The Client 402 visits 404 the Third Party site 403 as detailed above. The Third Party 403 returns a Web page containing a login button 405. The user at the Client 402 clicks on the login button which refers to the AOL Registration Server 401. If the user has not logged in, a login process is entered 407.

The AOL Authority Server 401 sends a user/site specific authentication token to the Third Party 403 via the Client 402. The AOL Authority Server 401 initiates the authentication process with the Third Party 403. The Third Party 403 checks to see that the authentication token is valid and sends its own authentication token 409 back to the AOL Authority server 401.

The AOL Authority Server 401 verifies from its partner database that the Third Party's authentication token is valid. If it is valid, then the AOL Authority Server 401 fills in the Third Party's form and returns it 410 to the Third Party 403.

A preferred embodiment of the invention performs the authentication and information transfer as follows:

1. Convey authentication (SN) to partner sites by a) passing an opaque, short-lived, site-specific authentication token to the site via browser redirects (via an auto-POSTed form), and b) having the partner site do a server-server "lookup" to validate the token and get back the corresponding SN.
2. Have partner sites issue a local session cookie or otherwise do local session tracking, so as to only require one authentication trip to trusted server per user session.

3. Convey profile/registration data to partner sites via browser redirects (again via auto-POSTed forms).
4. Utilize SSL instead of HTTP for browser-server and server-server interactions if/when supported by the partner site.
5. Where possible & practical, pass data via the POST method (form data) rather than the GET method (query arguments), so that the data is not exposed in browser histories and webserver logs.

Figure 5:
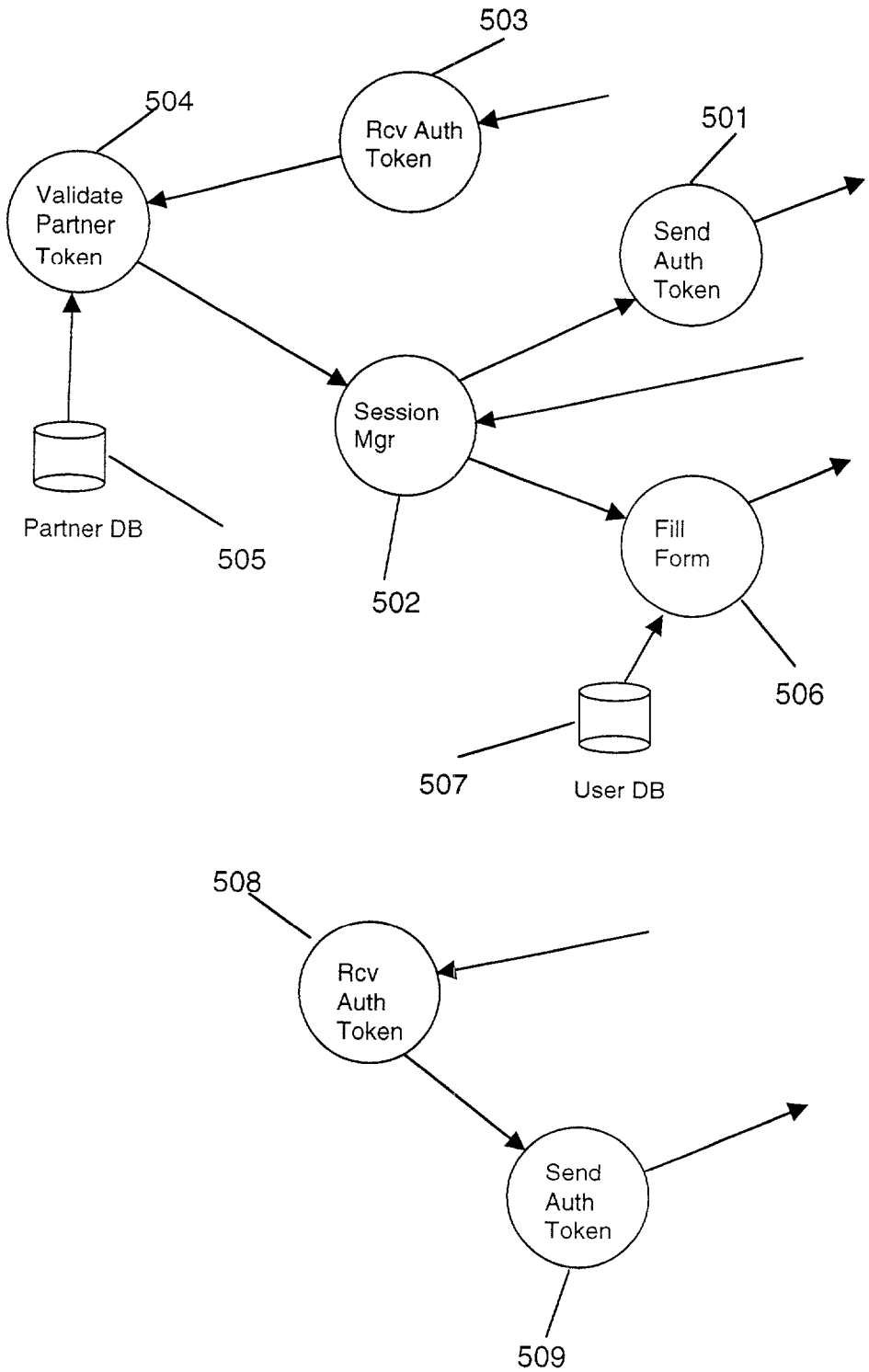
FIG. 5 is a block schematic diagram of a task viewpoint of the trusted server and partner token authentication components according to the invention.

Referring to FIG. 5, the Session Manager 502 on the trusted server receives the client's login request and begins the authorization process by triggering the Send Authentication Token module 501. The Send Authentication Token module 501 sends that server's authentication token to the third party.

The third party receives the token through the Receive Authentication Token module 508. The third party verifies the token and sends its own authentication token back to the server through the Send Authentication Token module 509. The third party also tracks the client's session or issues a session cookie to the client.

The trusted server receives the third party's authentication token through the receive Authentication token module 503. The Receive Authentication Token module 503 sends the third party's token to the Validate Partner Token module 504. The Validate Partner Token module 504 compares the third party's token with the known partners in the Partner Database 505. If the third party is a valid partner, then the Validate Partner Token module 504 signals the Session Manager 502 that it is okay to fill in the third party's form.

The Session Manager 502 passes the third party's form to the Fill Form module 506. The Fill Form module 506 retrieves the user's personal data and filter information from the User Database 507. The Fill Form module 506 then fills in the third party form using the user's filter information and personal data, filling in the areas of the form that the user has authorized or indicated through preferences. The filled form is then sent back to the client which forwards the form to the third party. The user is then logged into the third party's service.

Alternatively, if the third party is not a valid partner, then the Validate Partner Token module 504 signals the Session Manager 502 that it can conditionally fill in the third party's form. The Session Manager 502 passes the third party's form to the Fill Form module 506. The Fill Form module 506 retrieves the user's personal data and filter information from the User Database 507. The Fill Form module 506 then fills in the third party form using the user's filter information and personal data, filling in information on the form that the user has deemed to be a low security risk. The filled form is then sent back to the client which displays a pop-up message to the user indicating that the third party is an unknown entity and asking the user if the information filled in the form is okay to send to third party. if the user clicks on the okay button, the form is forwarded to the third party.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for an authentication and form-filling system that is transparent to users in a computer environment, comprising the steps of:
providing a trusted server;
receiving an authentication token from a third party site;
the trusted server authenticating said third party site as a partner site; and
the trusted server filling in user registration forms from said third party site with a user's information if said third party site is a partner;
providing a user database;
wherein said user database contains user personal information;
wherein said form filling step looks up the user's information from said user database;
wherein said user database contains user filter preferences, said filter preferences defining what user information is allowed to be released and under the conditions of any release of information;
wherein said form filling step uses the user's filter preferences from said user database to determine what information is entered into said third party's form; and
wherein said form filling step fills in information that the user has deemed to be a low security risk if said third party is not a partner.

2. The process of claim 1, wherein a user clicks on a login or helper button on said third party's site causing said trusted server to send an authentication token to said third party.

3. The process of claim 2, wherein said third party sends its own authentication token in response to said trusted server's token.

4. The process of claim 1, further comprising the step of:
providing a partner database;
wherein said partner database contains the valid partners and their associated authentication tokens; and
wherein said authentication step compares said third party's authentication token with said database to determine if said third party is a partner.

5. The process of claim 1, further comprising the step of:
sending said forms to the user; and
wherein the user approves the form before forwarding said form to said third party.

6. The process of claim 1, further comprising the step of:
sending said forms to said third party.

7. The process of claim 1, wherein said third party sends a session cookie to the user.

8. The process of claim 1, wherein said forms are passed via the POST method (form data) rather than the GET method (query arguments), so that the data are not exposed in browser histories and webserver logs.

9. A non-transitory program storage medium readable by a computer, tangibly embodying a program of instructions executable by the computer to perform method steps for an authentication and form-filling system that is transparent to users in a computer environment, comprising the steps of:
providing a trusted server;
receiving an authentication token from a third party site;
authenticating said third party site as a partner site; and
the trusted server filling in user registration forms from said third party site with a user's information if said third party site is a partner;
providing a user database,
wherein said user database contains user personal information;
wherein said form filling step looks up the user's information from said user database;
wherein said user database contains user filter preferences, said filter preferences defining what user information is allowed to be released and under the conditions of any release of information;
wherein said form filling step uses the user's filter preferences from said user database to determine what information is entered into said third party's form;

wherein said form filling step fills in information that the user has deemed to be a low security risk if said third party is not a partner.

10. The method of claim 9, wherein a user clicks on a login or helper button on said third party's site causing said trusted server to send an authentication token to said third party.

11. The method of claim 10, wherein said third party sends its own authentication token in response to said trusted server's token.

12. The method of claim 9, further comprising the step of: providing a partner database;
wherein said partner database contains the valid partners and their associated authentication tokens; and
wherein said authentication step compares said third party's authentication token with said database to determine if said third party is a partner.

13. The method of claim 9, further comprising the step of: sending said forms to the user; and
wherein the user approves the form before forwarding said form to said third party.

14. The method of claim 9, further comprising the step of: sending said forms to said third party.

15. The method of claim 9, wherein said third party sends a session cookie to the user.

16. The method of claim 9, wherein said forms are passed via the POST method (form data) rather than the GET method (query arguments), so that the data are not exposed in browser histories and webserver logs.

17. A process for an authentication and form-filling system that is transparent to users in a computer environment, comprising the steps of:
providing a trusted server;
receiving an authentication token from a third party site;
the trusted server authenticating said third party site as a partner site;
the trusted server filling in user registration forms from said third party site with a user's information if said third party site is a partner; and
sending said user registration forms to the user;
wherein the user approves a registration form before forwarding said registration form to said third party.

18. The process of claim 17, wherein a user clicks on a login or helper button on said third party's site causing said trusted server to send an authentication token to said third party.

19. The process of claim 18, wherein said third party sends its own authentication token in response to said trusted server's token.

20. The process of claim 17, further comprising the step of: providing a partner database;
wherein said partner database contains the valid partners and their associated authentication tokens; and
wherein said authentication step compares said third party's authentication token with said database to determine if said third party is a partner.

21. The process of claim 17, further comprising the step of: providing a user database;
wherein said user database contains user personal information; and
wherein said form filling step looks up the user's information from said user database.

22. The process of claim 21, wherein said user database contains user filter preferences, said filter preferences define what user information is allowed to be released and under the conditions of any release of information, and wherein said form filling step uses the user's filter preferences from said user database to determine what information is entered into said third party's form.

23. The process of claim 22, wherein said form filling step fills in information that the user has deemed to be a low security risk if said third party is not a partner.

24. The process of claim 17, further comprising the step of: sending said forms to said third party.

25. The process of claim 17, wherein said third party sends a session cookie to the user.

26. The process of claim 17, wherein said forms are passed via the POST method (form data) rather than the GET method (query arguments), so that the data are not exposed in browser histories and webserver logs.

27. A non-transitory program storage medium readable by a computer, tangibly embodying a program of instructions executable by the computer to perform method steps for an authentication and form-filling system that is transparent to users in a computer environment, comprising the steps of:
providing a trusted server;
receiving an authentication token from a third party site;
authenticating said third party site as a partner site; and
the trusted server filling in user registration forms from said third party site with a user's information if said third party site is a partner;
sending said user registration forms to the user; and
wherein the user approves a registration form before forwarding said registration form to said third party.

28. The method of claim 27, wherein a user clicks on a login or helper button on said third party's site causing said trusted server to send an authentication token to said third party.

29. The method of claim 28, wherein said third party sends its own authentication token in response to said trusted server's token.

30. The method of claim 27, further comprising the step of: providing a partner database;
wherein said partner database contains the valid partners and their associated authentication tokens; and
wherein said authentication step compares said third party's authentication token with said database to determine if said third party is a partner.

31. The method of claim 27, further comprising the step of: providing a user database;
wherein said user database contains user personal information; and
wherein said form filling step looks up the user's information from said user database.

32. The method of claim 31, wherein said user database contains user filter preferences, said filter preferences define what user information is allowed to be released and under the conditions of any release of information, and wherein said form filling step uses the user's filter preferences from said user database to determine what information is entered into said third party's form.

33. The method of claim 32, wherein said form filling step fills in information that the user has deemed to be a low security risk if said third party is not a partner.

34. The method of claim 27, further comprising the step of: sending said forms to said third party.

35. The method of claim 27, wherein said third party sends a session cookie to the user.

36. The method of claim 27, wherein said forms are passed via the POST method (form data) rather than the GET method (query arguments), so that the data are not exposed in browser histories and webserver logs.

* * * * *